(No Model.)

E. M. IVENS.
APPARATUS FOR BALING COTTON.

No. 502,193. Patented July 25, 1893.

WITNESSES:
Fred G. Dieterich
M. D. Blondel

INVENTOR:
Edmund M. Ivens.
BY Munn & Co
ATTORNEYS

UNITED STATES PATENT OFFICE.

EDMUND M. IVENS, OF NEW ORLEANS, LOUISIANA, ASSIGNOR TO EMILY L. IVENS, OF SAME PLACE.

APPARATUS FOR BALING COTTON.

SPECIFICATION forming part of Letters Patent No. 502,193, dated July 25, 1893.

Application filed June 25, 1892. Serial No. 438,037. (No model.)

*To all whom it may concern:*

Be it known that I, EDMUND M. IVENS, residing at New Orleans, in Orleans parish and State of Louisiana, have invented a new and Improved Apparatus for Baling Cotton, of which the following is a specification.

This invention relates more particularly to that class of baling machines which operate to bale cotton by what is known as the "roller process," and it has for its object to provide an apparatus of this character which will serve its purpose in an effectual, economical and simple manner.

My invention consists primarily in a rotatable press box having dual compartments, in which are arranged counter balanced followers adapted to be held to any of their intermediate adjusted positions by hydraulic power.

It consists furthermore in simple and effective means operated by the presser platen feed mechanism for swinging the press box.

It also consists in a variable and accumulative presser platen feed mechanism, whereby the bale can be treated to a pluralilty of presser applications of different speed and accumulated power.

My invention finally consists in the peculiar details and novel combinations of parts all of which will be hereinafter fully described in the specification and pointed out in the claims, reference being had to the accompanying drawings, in which—

Figure 1:
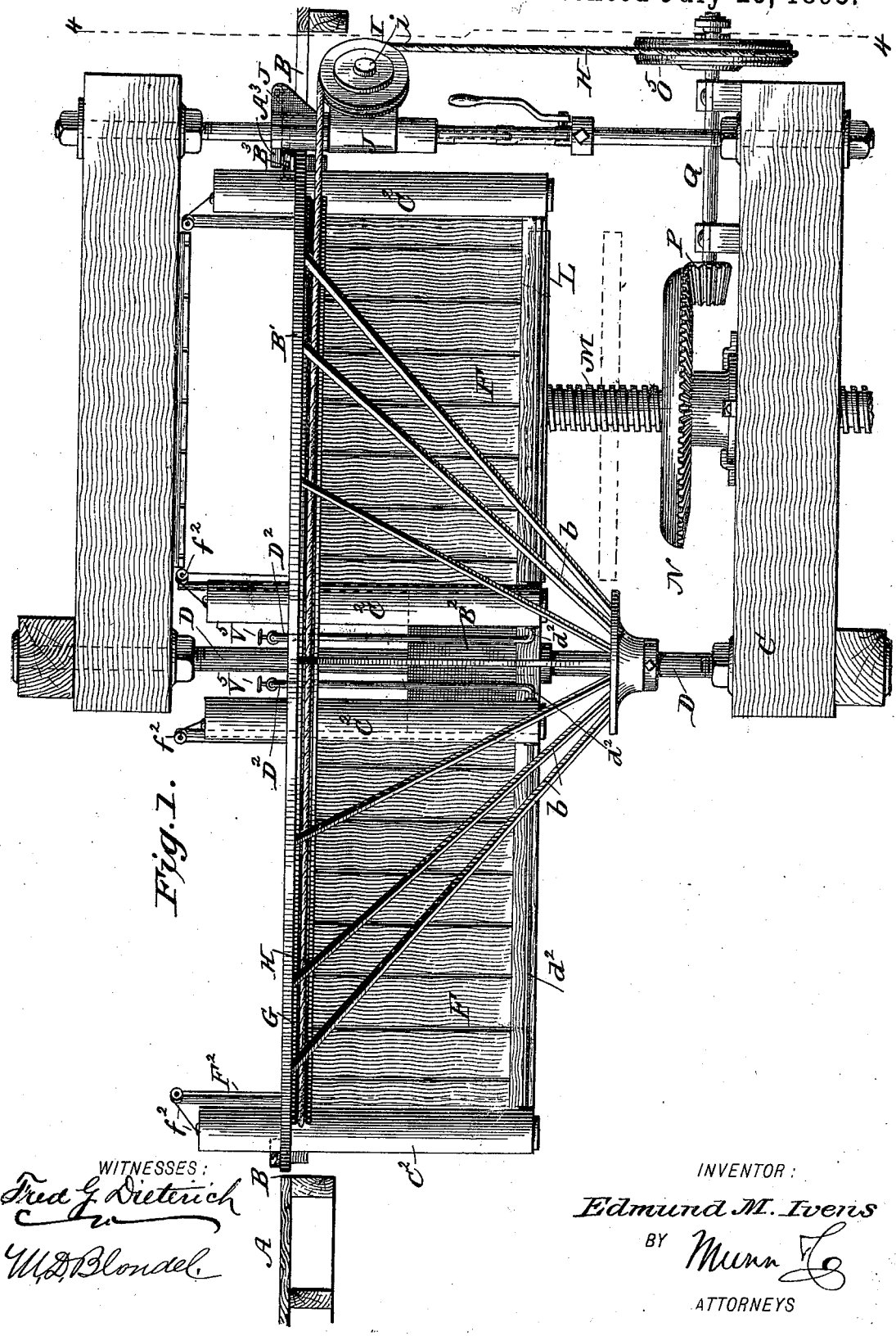
Figure 2:
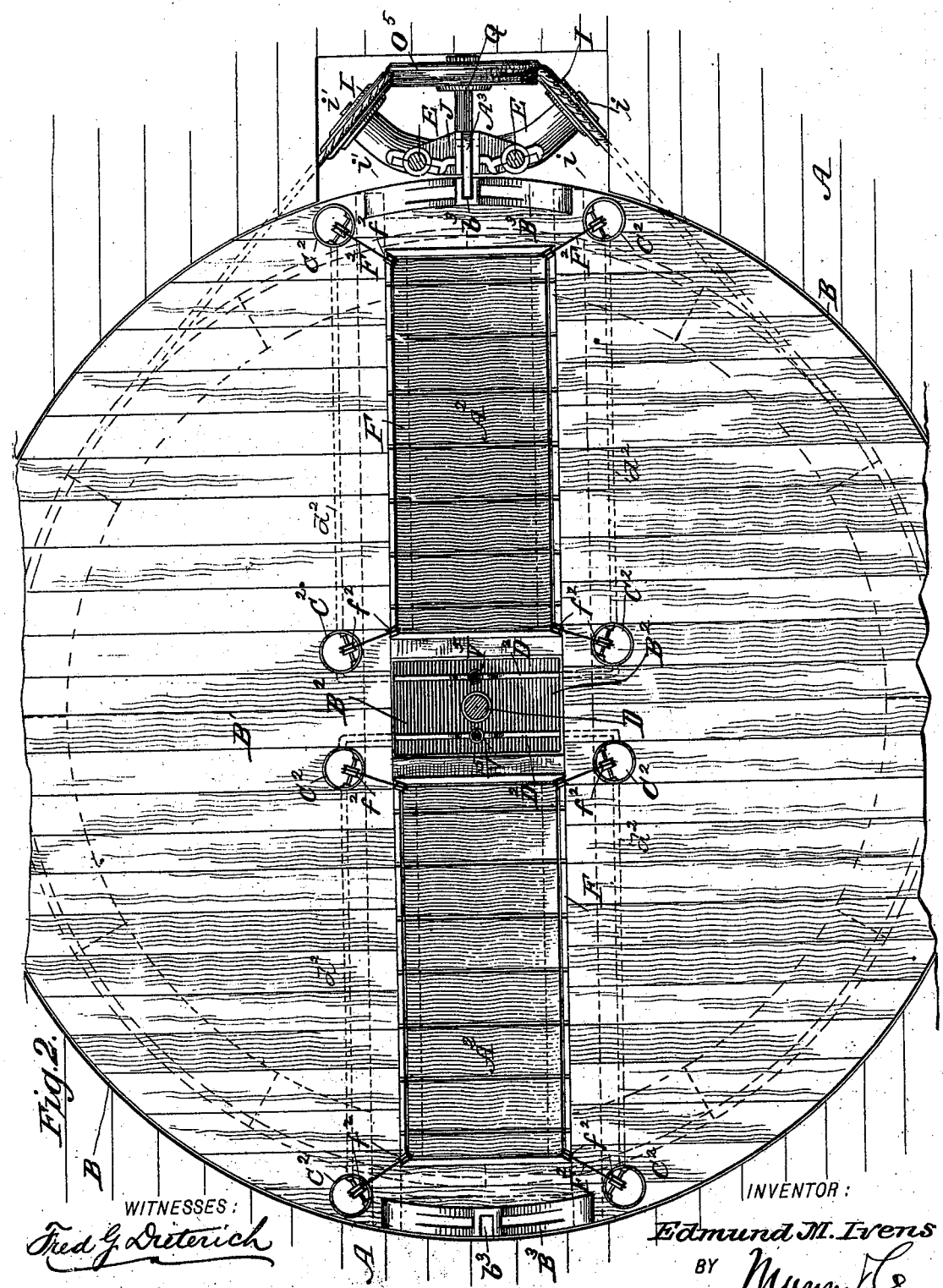
Figure 3:
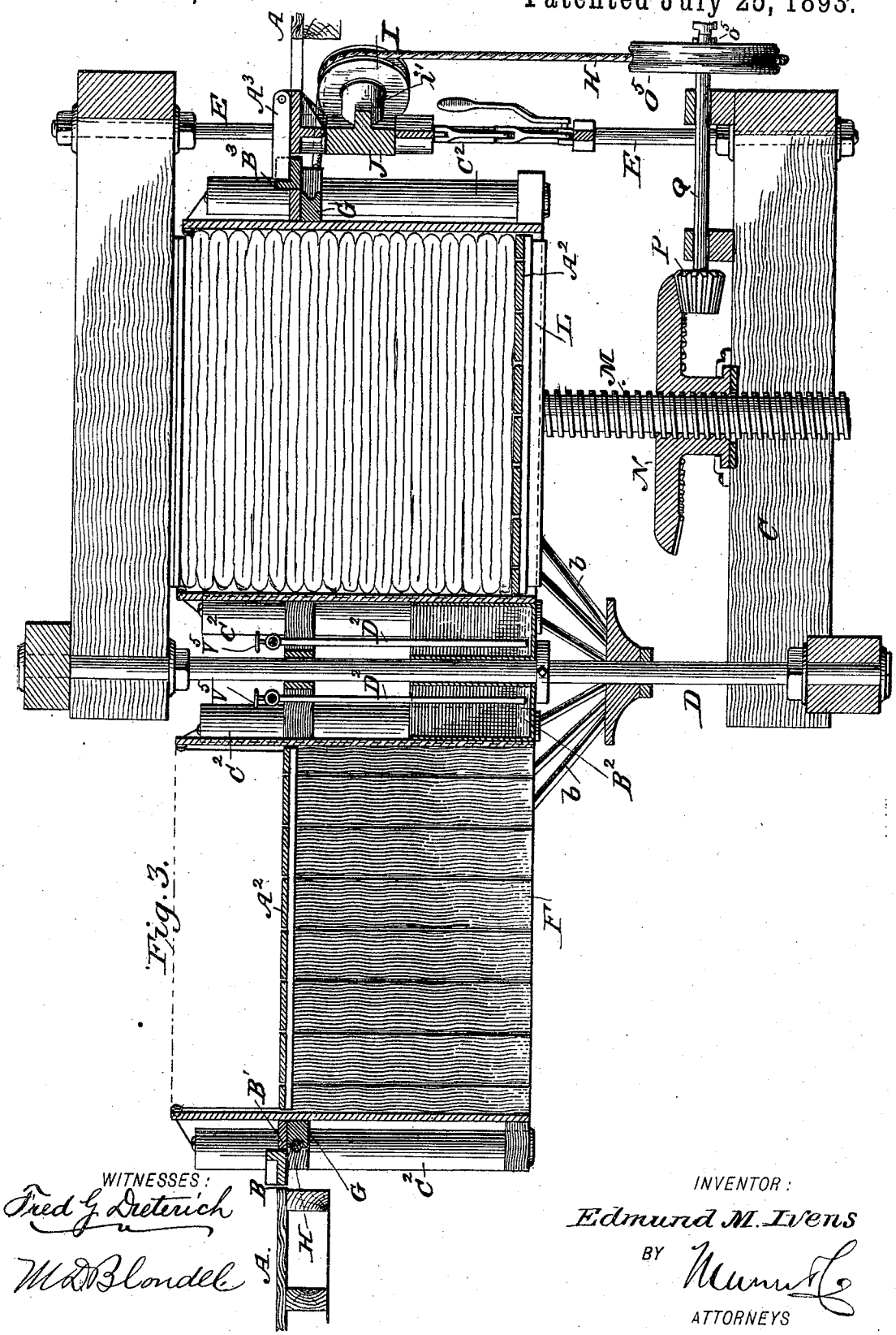
Figure 4:
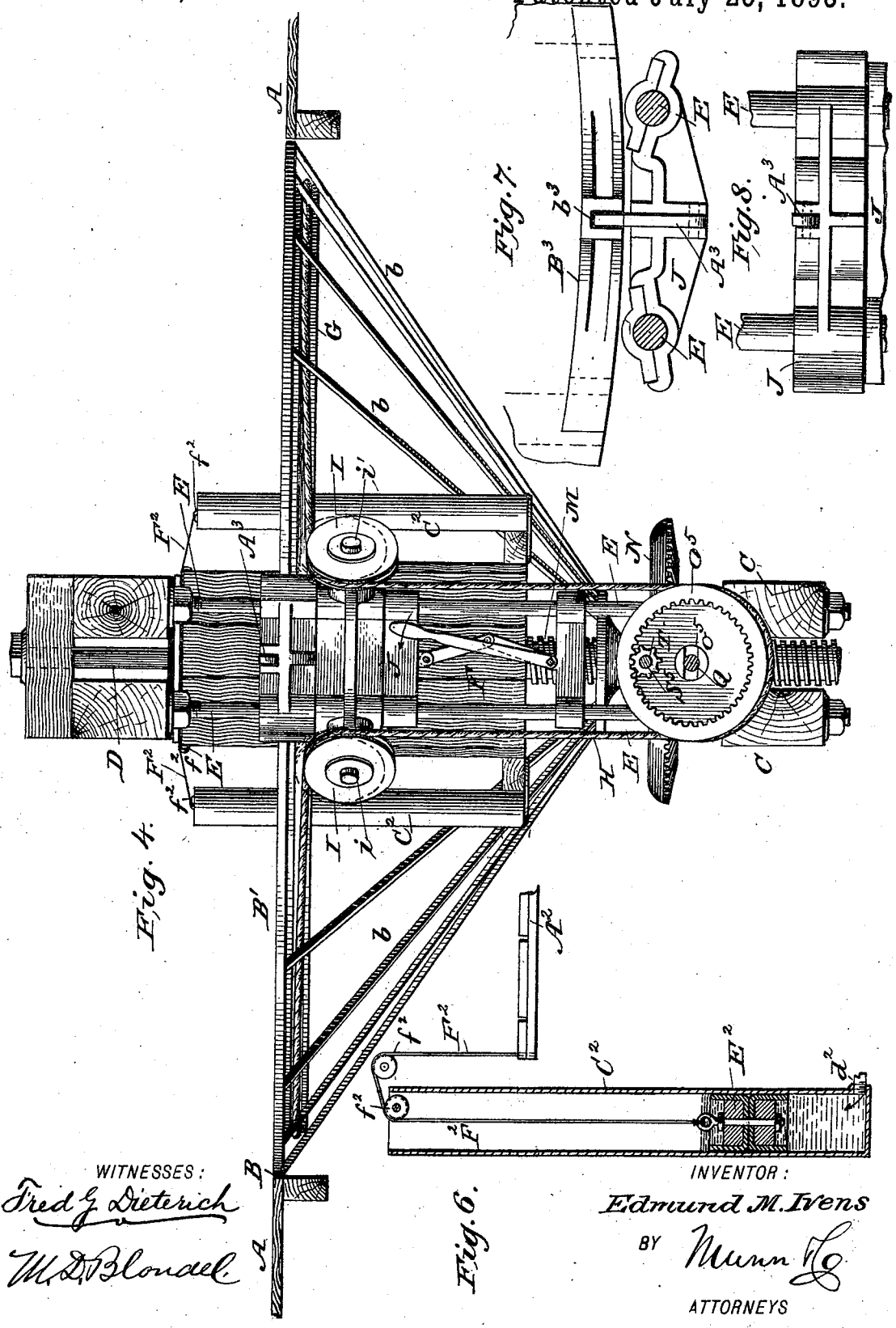
Figure 5:
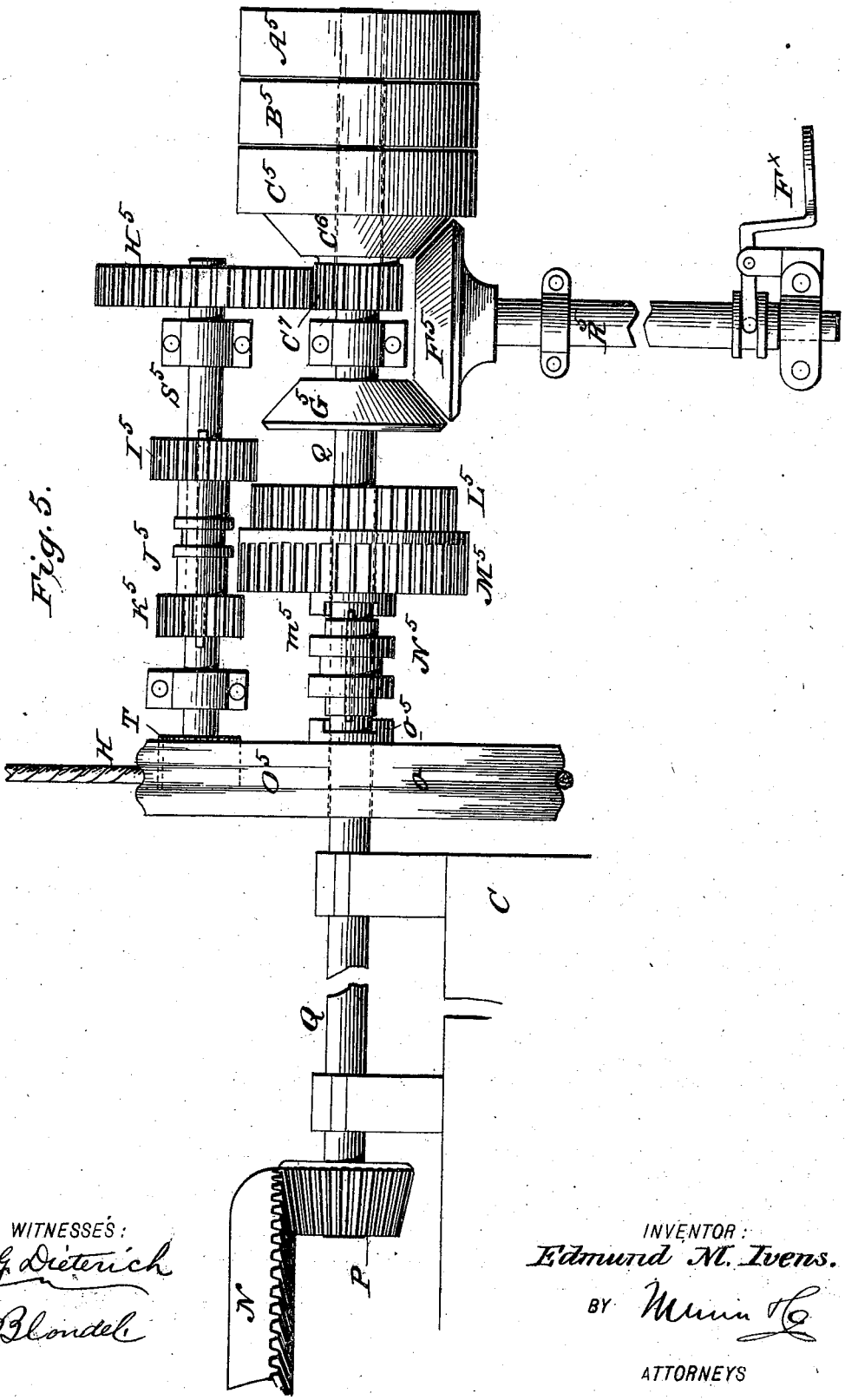

Figure 1 is a side elevation of my improved baling apparatus. Fig. 2 is a top plan view thereof. Fig. 3 is a vertical longitudinal section thereof. Fig. 4 is a transverse section on the line 4—4, Fig. 1. Fig. 5 is an enlarged sectional elevation of the accumulative and variable feed gearing. Fig. 6 is a longitudinal section of one of the hydraulic follower cylinders. Figs. 7 and 8 are detail views of the cotton box latch devices hereinafter referred to.

Referring to the accompanying drawings, A indicates the gin house floor having a circular opening B, in which turns a circular floor section which is connected to and rotates with the press box in the manner presently described.

C indicates the base sills disposed below the gin house floor in which is secured the lower end of the king post D, the upper end of which is secured to the upper longitudinal top beams, which extend over one end of the press box and which I shall term the cross head beams, as to them is secured the upper or fixed presser platen. The outer ends of these beams are braced to the bottom sills by the strain or queen posts E E, as most clearly shown in Fig. 3 of the drawings. The press box F is centrally journaled upon the king post and is formed with dual compartments, which alternately form a receiving and baling compartment. The upper portion or tie end of the press box is projected above the floor section B' which section is braced to the press box frame by the diagonal brace bars b, and in practice is fifteen feet in diameter, such floor section being disposed just below the upper doors of the press box.

Upon the under side of the circular floor B' is secured an iron sheave G, formed in segments, which sheave forms the drive sheave as around this is run an endless drive rope H, which also passes over guide pulleys I, held on horizontal axis $i\ i'$ and rotating in a direction tangential to the large sheave G. These sheaves I are journaled on a movable casting J, held for vertical adjustment on the queen posts E, their inner or adjacent edges being disposed directly over the circumferential edges of a drive wheel $O^5$ driven by the presser platen feed gearing hereinafter referred to.

L indicates the presser platen which is disposed under the cross head beams and is mounted on the upper end of the screw M, with which engages the internally threaded master wheel N, the under cog face of which meshes with the drive pinion P, mounted on the inner end of the drive shaft Q.

To make time while the cotton is soft and to finish with a greatly increased power at the end of the thrust of the platen, I provide the accumulative and variable feed mechanism most clearly shown in Fig. 5 of the drawings, such mechanism consisting of a main drive shaft Q, journaled in suitable bearings on the base timbers on one end of which are a fast pulley $A^5$ and two loose pulleys $B^5$ and $C^5$, the pulley $C^5$ having a friction bevel wheel $C^6$ and a gear $C^7$ formed integral therewith.

$G^5$ indicates a bevel friction wheel keyed to the shaft Q and $L^5$, $M^5$ gear wheels of different diameters, but cast integral, which are also loosely journaled on the shaft Q, one face of the gear wheel $M^5$ having a clutch collar $m^5$.

$O^5$ indicates an internally threaded wheel loosely mounted on the shaft Q, the outer face having a grooved rim $o$ to accommodate the press box drive rope H while its hub portion has a clutch collar $o^3$.

$N^5$ indicates a double clutch feathered to the shaft Q and disposed intermediate the clutch collars $m^5$ $o^5$.

Arranged parallel with the shaft Q is a second shaft $S^5$ on the outer end of which is secured a pinion T which projects into and meshes with the internal gear $O^5$ and about centrally thereof is feathered a laterally movable clutch sleeve $J^5$ having a gear $K^5$ at its inner end and a gear $I^5$ of larger diameter at its outer end.

$H^5$ indicates a large gear wheel fixedly held on the outer end of the shaft $S^5$.

$F^5$ indicates a bevel friction wheel secured upon the upper end of a vertically movable shaft $R^5$, and disposed between the bevel wheels $C^6$ $G^5$ but normally out of contact therewith.

By arranging the presser feed gear mechanism as described I am enabled to get a direct application through the pinion P, which is seven to one, an intermediate application through $I^5$ and $L^5$ thirty-five to one and a powerful accumulative pressure, when $K^5$ $M^5$ are used, which is seventy to one, the press slowing down from sixty inches per minute to twelve inches, and thence to six inches rise of follower in a minute.

In operation to begin work the belt is moved from loose pulley $B^5$ to pulley $A^5$ and power applied direct to the shaft Q which communicates power through the pinion P to the master wheel and screw press, which will be operated to move rapidly up into the press box. After this power is exhausted the belt is moved back onto the pulley $B^5$ and the gear $I^5$ is moved to mesh with the wheel $L^5$ and the clutch $N^5$ to engage the wheel $M^5$, the belt is again moved to pulley $C^5$ and the indirect medium accumulative power at a reduced speed applied. After this power is exhausted a still further compression at a greatly increased power, at a greatly reduced speed, is obtained by shifting the belt again to pulley $B^5$, shifting sleeve $J^5$ to disengage the wheels $L^5$ and $I^5$ and the wheels $K^5$ and $M^5$ brought into mesh and the belt again moved onto the pulley $C^5$ and the press run to a finish. While the bale is being hooped the gears $I^5$ and $M^5$ are disengaged, the clutch $N^5$ moved from the wheel $M^5$ and into engagement with the clutch on the internal gear $O^5$, the platen is then run down sufficiently to remove the bale from the press after which the clutch $N^5$ is disengaged entirely and the friction wheels $D^5$ $G^5$ are engaged by the wheel $F^5$, such wheel being held in contact with the wheels $D^5$ $G^5$ by the operator standing on the lever $F^x$ until the follower reaches the bottom when by simply stepping off the lever the wheel $F^5$ will drop out of service and the press will stop. It will be readily understood that during the time the press is lowered from the pressed bale, through the indirect motion imparted to the shaft Q through the internal gear $O^5$, that the revolution of such gear can have no effect upon the slack press box rope which passes around it. After the press is stopped the reverse motion is again applied to the loose externally groove gear $O^5$ through the loose pulley $C^5$, gears $C^7$ and $H^5$ and shaft $S^5$ and pinion T and the casting on the queen posts is moved up so as to bring the rope to a taut bite about the press box floor wheel, the guide wheels I and the gear $O^5$ and at the same time by releasing the lock catch $A^3$, the press box will rotate about the king post until the filled compartment comes over the presser platen at which time the latch $A^3$ will engage a stop $B^3$ on the press box frame and hold it for further movement, the boxes making only half a turn at each time.

Any suitably arranged latch devices may be employed, but I prefer to use the devices shown most clearly in Figs. 7 and 8, by reference to which it will be seen that upon the ends of the longitudinal timbers of the press box castings $B^3$ are secured having upwardly inclined faces which end at lock notches $b^3$ at each side of a central stop lug, and upon the vertically movable castings are pivotally held gravity latch bolts $A^3$ the ends of which project over and engage the lock plate $B^3$ when the said castings are at their depressed or lowermost position, such latches being held lifted out of engagement so long as the castings are raised to tighten the operating rope, and so soon as the casting J is dropped to slacken the operating rope and stop the press from rotating, the latch $A^3$ is also dropped to the proper position to engage the inclined faces of the casting $B^3$ and fall into the notch $b^3$ as such casting is brought into position by the inertia of the press box.

In each compartment of the press box are held counter balanced followers $A^2$, which are so adjusted that the cotton (as it is fed therein from the lapping devices usually employed in this mode of compressing cotton) as it increases in weight will gradually depress such followers.

As a simple and effective means for automatically holding such followers to any intermediate position desired, I arrange the counter balance devices to be operated by hydraulic means.

Referring now more particularly to Figs. 1 and 2, it will be noticed that disposed about the king post and intermediate the inner ends of the cotton chambers of the press box, and secured to such box is a water holding tank $B^2$, with which is connected a series of cylinders $C^2$, four for each cotton compartment, such connection being formed of valved pipes $D^2$, which have laterals $d^2$ which empty into the bottom of each of such cylinders.

Instead of using weights for counter balancing the followers, as is usually the case, I employ in each cylinder a solid piston $E^2$, covered with oil or water to keep it tight which pistons (four for each follower) serve to balance the follower, they being connected thereto by the ropes $F^2$, which are secured to the pistons, pass up over sheaves $f^2$ and connect to the corners of the followers as shown.

In operation as the cotton is folded on the follower in the receiving compartment, the weight of the cotton forces it down and in so doing raises the pistons in the four cylinders; each of which draws up with it (as in the case of a pump) water which shall in the four pipes per foot be equal to a perpendicular foot of cotton on the follower and so on until the cotton box is filled. When the follower gets to the bottom, the pistons are in the upper end of the cylinders, each of which is then filled with water thereunder from the tank $B^2$. At this point the box is swung around in the manner before described, and the bale compressed and hooped. The presser platen is then backed down to a sufficient distance to remove bale, and the screw is then stopped, and the valve $V^5$ in the pipe which supplies the four cylinders on that side is closed. This holds the follower in position after the bale has been removed, as the water cannot go back into the tank $B^2$ until valve $V^5$ is opened. As soon as the bale is out open valve $V^5$ and the pistons will sink to the bottom of the tubes and as a consequence the follower will ascend and re-establish itself ready for another bale. As a matter of convenience the valved pipes are extended up above the revolving floor so as to be in convenient reach of the operator standing on such floor.

From the foregoing description taken in connection with the drawings, the complete operation of my cotton baling apparatus will be readily understood. By its use the operation of turning the press box is substantially automatic, the movement of the followers entirely so and the compressing mechanism of such a nature as to provide for a rapid, complete formation of the bale, compressed to the density desired.

Having thus described my invention, what I claim, and desire to secure by Letters Patent, is—

1. In a cotton baling apparatus, in combination, a rotatable press box, having a horizontal band wheel, the compressor platen operating in the press box, the presser platen mechanism, including a continuously operated drive pulley, an endless rope loosely held about such band wheel and drive pulley, and movable sheaves arranged intermediate the band and drive pulleys to serve as guides for the rope, and adapted when moved in one direction to place such rope in tight frictional contact with such drive and band pulleys as and for the purposes described.

2. In a cotton baling apparatus, the combination of the frame, the cross head, the central or king post and end queen posts, the dual press box rotatable thereon having a horizontal band drive wheel, mechanism, including an externally grooved drive pulley, the endless rope guide wheels, vertically adjustable on the queen posts, operating to guide the said rope from the band wheel to the pulley and means for raising such guide wheels, whereby to tighten the rope on such pulley and band wheel, substantially as and for the purpose described.

3. In a cotton baling apparatus, the combination with the rotatable press box having dual compartments, means for rotating it, a lock plate at each end thereof, a latch for automatically engaging one of such lock plates at each semi rotation of the box, said latch held on a vertically adjustable bearing plate and means for raising such plate whereby to release the latch, substantially as and for the purpose described.

4. In a cotton baling apparatus, the combination with the rotatable dual press box having lock plates at each end and a horizontal band wheel, a drive pulley, means for operating it continuously, and an endless rope or cable passing loosely around such wheel and drum, of a vertically adjustable bearing plate, guide sheaves journaled thereon, engaging the opposite strands of the rope as it leaves the band wheel, and a latch pivoted on such adjustable bearing plate adapted to engage the lock on the coincident end of the press box when the bearing plate is in its lowermost position and means for raising such bearing plate whereby to throw the rope in a tight frictional contact with the pulley and band wheel and to lift the latch from the lock plate, all substantially as shown and described.

5. In a cotton baling press, the combination of a rotatable press box having dual compartments, a fixed cross head over one of such compartments, a presser platen arranged to operate against such cross head, feed mechanism for such presser platen, intermediate connections between such mechanism and press box and shifting devices for such mechanism, all constructed and arranged substantially as shown, whereby such connections can be adjusted to operate to rotate the press box when the presser platen is at its lowermost position and out of the press box, as and for the purpose described.

6. In a cotton baling apparatus, the combination with the press box, the cross head, and the screw platen of the platen operating mechanism comprising the shaft Q carrying the drive pinion P, the fast and loose pulleys $A^5$ $B^5$ $C^5$, said pulley $C^5$ formed with a gear $C^7$, the internally geared loose pulley O, having a clutch hub, the sliding clutch $N^5$, on the shaft Q, the counter shaft $S^5$ having gear T meshing with the internal pulley O and a gear $H^5$ meshing with the gear $C^7$, all substantially as shown and for the purpose described.

7. In a cotton baling apparatus, the combination with the press box and the screw platen, the drive shaft Q for operating such screw platen, of the fast and loose pulleys $A^5$ $B^5$ and $C^5$, the pulley $C^5$ having a gear $C^7$, the gears $L^5$ $M^5$, loosely mounted on the shaft Q, said gear $M^5$ having a clutch collar, the counter shaft $S^5$ provided with a gear $H^5$, meshing with the gear $C^7$, and with slidable gears $I^5$ and $K^5$ adapted to be alternately moved into mesh with the gears $L^5$ and $M^5$ and the sliding clutch $N^5$ on shaft Q, all arranged substantially as and for the purpose described.

8. In a cotton baling apparatus the combination with the press box, cross head and screw platen and the screw platen operating shaft Q, of the fast and loose pulleys $A^5$, $B^5$, and $C^5$ and frictional bevel pulley $G^5$ fixedly held on such shaft, said pulley $C^5$ having a bevel friction pulley section $C^6$, of the vertically adjustable shaft $R^5$ having bevel pulley $F^5$ adapted to be moved into engagement with the pulleys $G^5$ and $C^6$, all substantially as and for the purpose described.

9. In a cotton baling apparatus substantially as described, the combination with a press box and follower vertically movable therein, of water chambers, pistons operating therein, said pistons connected with the followers, a water supply discharging into the bottom of the water chambers all arranged substantially as shown whereby a counterbalance is formed for the followers, as the pistons are movable in the water chambers by the alternating weight on the follower in the press box as and for the purpose described.

10. In a cotton baling apparatus substantially as described the combination with a press box having dual chambers, and followers movable in such chambers, of counterbalance devices held on the press box and such devices, comprising water chambers, pistons operating therein said pistons connected to the followers, and a main supply tank connected with such water chambers, all arranged substantially as shown, whereby a water balance is drawn under such pistons as they are pulled up by the weighted followers, and whereby such water is forced back into the reservoir or tank when the pistons fall and raise the followers, and valved connections for such water chambers, for cutting off such chambers from the supply reservoir, when it is desired to hold the pistons and followers at any given point all substantially as shown and described.

11. The combination with a rotatable press box having dual chambers followers vertically movable therein, a water supply tank, and cylinders carried on such box, valved pipe connections between the tank and the cylinders, pistons operating in such cylinders and flexible connection between such cylinders and the follower substantially as and for the purpose described.

EDMUND M. IVENS.

Witnesses:
AMBROSE WAGNER,
R. TOOMBS WRIGHT.